US 12,014,550 B1

United States Patent
Yaron et al.

(10) Patent No.: US 12,014,550 B1
(45) Date of Patent: Jun. 18, 2024

(54) IMAGE DATA PROTECTION USING DATA INTEGRITY CHECKS

(71) Applicant: Zoox, Inc., Foster City, CA (US)

(72) Inventors: Maxwell Ethan Mckenzie Yaron, Palo Alto, CA (US); Turhan Karadeniz, Oakland, CA (US); Andrew Lewis King, Los Altos, CA (US); Sandra Ruiz, Newark, CA (US); Nathaniel John Villaume, Foster City, CA (US); Subasingha Shaminda Subasingha, San Ramon, CA (US)

(73) Assignee: ZOOX, INC., Foster City, CA (US)

( * ) Notice: Subject to any disclaimer, the term of this patent is extended or adjusted under 35 U.S.C. 154(b) by 601 days.

(21) Appl. No.: 17/214,587

(22) Filed: Mar. 26, 2021

(51) Int. Cl.
   *G06V 20/56* (2022.01)
   *G06F 11/10* (2006.01)
   *G06V 10/75* (2022.01)

(52) U.S. Cl.
   CPC .......... *G06V 20/56* (2022.01); *G06F 11/1004* (2013.01); *G06F 11/1048* (2013.01); *G06V 10/751* (2022.01)

(58) Field of Classification Search
   CPC ..... G06V 10/75; G06F 11/10; G06F 11/1004; G06F 11/08
   See application file for complete search history.

(56) References Cited

U.S. PATENT DOCUMENTS

| | | | | |
|---|---|---|---|---|
| 6,802,038 | B1 * | 10/2004 | Yu | H03M 13/451 |
| | | | | 714/758 |
| 8,787,460 | B1 * | 7/2014 | Hobbs | H04N 19/00 |
| | | | | 375/240.16 |
| 9,106,259 | B2 * | 8/2015 | Wang | H03M 13/091 |
| 2018/0165814 | A1 * | 6/2018 | Gulati | G06T 7/001 |

FOREIGN PATENT DOCUMENTS

| | | | | |
|---|---|---|---|---|
| CN | 107451008 A | * | 12/2017 | .......... G06F 11/1004 |
| KR | 101504697 B1 | * | 10/2014 | .......... H04L 1/0056 |
| WO | WO-2014049796 A1 | * | 4/2014 | ............ H03M 13/09 |

OTHER PUBLICATIONS

Machine translation of WO-2014049796-A1 (Year: 2014).*
Machine translation of CN-107451008-A (Year: 2008).*
Machine translation of KR101504697B1 (Year: 2014).*
Sony Semiconductor Solutions Corporation, Editor and Publisher, "IMX490 Safety Application Note," Rev. 0.1.3 Oct. 9, 2019, 149 pages.

* cited by examiner

*Primary Examiner* — John Villecco
*Assistant Examiner* — Courtney Joan Nelson
(74) *Attorney, Agent, or Firm* — Lee & Hayes P.C.

(57) ABSTRACT

Techniques for image data protection using cyclic redundancy checks are disclosed herein. Some of the techniques may include, at a processor, receiving image data that includes multiple lines of pixel data. The processor may also determine at least a first hash value representing a first line of pixel data of the multiple lines of pixel data and a second hash value representing a second line of pixel data of the multiple lines of pixel data. The processor may also send the image data to a computing device that is configured to determine, based at least in part on the first hash value and the second hash value, whether the image data is corrupt.

20 Claims, 7 Drawing Sheets

IMAGE DATA PROTECTION USING DATA INTEGRITY CHECKS

BACKGROUND

In safety-critical systems, validating data received from hardware devices can be important. For instance, corruption of data received from these hardware devices can be caused by environmental noise, data pipeline faults, etc. As such, if a failure does occur, the failure should be detected so that downstream consumers of the data can be made aware. However, detecting such failures can be computationally expensive and difficult.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Techniques for image data protection using data integrity checks are disclosed herein. As discussed above, in safety-critical systems, validating data received from hardware devices can be imperative. For instance, data can be corrupted prior to being received from these hardware devices. As such, if a failure does occur, the failure should be detected so that downstream consumers of the data can be made aware. However, detecting such failures can be computationally expensive.

One way of detecting these failures is by using a cyclic redundancy check (CRC), or other data integrity check, which is an error-detecting code that can be used in digital networks and storage devices to detect inadvertent changes to raw data. For example, a CRC can work by attaching a "check value" to a block of data. The check value is based on a remainder of a polynomial division of the contents within that block of data. On retrieval, the calculation is repeated and, in the event the check values do not match, corrective action can be taken against data corruption. Calculating a CRC check value for a respective block of data (e.g., an image file) can be a serial operation. However, several modern applications, such as machine vision applications, are highly optimized for parallelized processors, such as a graphics processing unit (GPU). Accordingly, calculating a full-frame CRC (e.g., a single check value representing all the pixel data included in a single image file) using a GPU is computationally inefficient and may not provide the fidelity disclosed in the techniques herein.

Accordingly, this disclosure describes various techniques for protecting image data using data integrity checks by, among other things, calculating and appending a data integrity value (e.g., CRC check value, hash value, checksum value, parity bit, or the like) to each line of pixel data included in a respective image data file (referred to herein as a "per-line data integrity check"). In other words, instead of (or in addition to) determining a single data integrity value representing all the lines of pixel data in an image file (e.g., a full-frame data integrity check), the techniques described herein can include calculating multiple data integrity values representing the lines of pixel data in an image file, where each individual data integrity value of the multiple data integrity values can represent a respective single line of pixel data (e.g., a per-line data integrity check). In this way, the multiple data integrity values of a per-line data integrity check may be calculated in parallel, thereby reducing the computational expenses associated with calculating a full-frame data integrity check at a parallelized processor. In certain examples, a data integrity check can be performed on any denomination of pixel values (e.g., one data integrity value can be associated with two lines of pixels, for a subregion/area of pixels, in any combination).

For instance, a camera co-processor may determine and append a per-line data integrity check to lines of pixel data of an image data file. Then, the camera co-processor may send the image data file over a communication connection to, for instance, a GPU. Accordingly, when the GPU receives the image data file, the GPU may calculate its own per-line data integrity values and compare them with the data integrity values that were appended to the image data file by the camera co-processor. If the compared data integrity values match, then the image data can be determined to be uncorrupted (or a probability of the data being corrupted is low). However, if some of the compared data integrity values do not match, then the image data file, or a portion of the image data file, may have been corrupted while being sent to the GPU from the camera co-processor.

By way of example, and not limitation, a method according to the various techniques disclosed herein may include receiving, at a first processor, image data captured by an image sensor, the image data including multiple lines of pixel data. The image data and/or the multiple lines of pixel data may represent an image captured by the image sensor. Additionally, a single line of pixel data may include multiple pixel data values (e.g., an array of pixel data values) representing pixels of the image. In some examples, the first processor and the image sensor may be part of a camera module. Additionally, the camera module may be attached to, removably coupled with, or otherwise associated with a vehicle that captures images representing a portion of an environment in which the vehicle is operating.

In some examples, the first processor may calculate or otherwise determine multiple data integrity values (e.g., CRC check values, hash values, checksum values, parity bits, etc.) associated with the multiple lines of pixel data. That is, the first processor may determine, for each line of pixel data of the multiple lines of pixel data, a corresponding data integrity value that represents a specific combination of pixel data values included within that line of pixel data. For instance, the first processor may determine a first data integrity value representing a first array of pixel data values included within a first line of pixel data, a second data integrity value representing a second array of pixel data values included within a second line of pixel data, a third data integrity value representing a third array of pixel data values included within a third line of pixel data, and so forth. In some examples, the first processor may use a function (e.g., hashing function) to calculate the data integrity values.

Additionally, in examples, the first processor may append or otherwise associate the respective data integrity values to their respective lines of pixel data of the image data. For instance, the first data integrity value may be appended to the first line of pixel data such that the image data includes the first data integrity value, the second data integrity value may be appended to the second line of pixel data such that the image data includes the second data integrity value, the third data integrity value may be appended to the third line of pixel data such that the image data includes the third data integrity value, and so forth. In some instances, the data integrity values may be appended to the end of a line of pixel data. For example, the first data integrity value may be appended to the end of the first line of pixel data, the second data integrity value may be appended to the end of the second line of pixel data, the third data integrity value may be appended to the end of the third line of pixel data, and so forth.

In some examples, the method may also include sending the image data to a second processor of the vehicle for processing. The second processor may, in some instances, comprise a parallelized processing unit of the vehicle that is capable of performing many parallel operations simultaneously and/or having many relatively simple parallelized processors, such as a graphics processing unit (GPU), a field programmable gate array (FPGA), an application specific integrated circuit (ASIC), or another parallelized processing unit. The second processor may be part of a computing system of the vehicle that is separate from the camera module but in communication with the camera module. As such, the camera module may be disposed at a first location of the vehicle (e.g., external surface of the vehicle) and the second processor and/or computing system of the vehicle may be disposed at a second location of the vehicle (e.g., an interior surface or compartment of the vehicle). Additionally, the camera module and the second processor and/or computing system may communicate with one another using one or more communication connections. In some examples, the first processor and/or the second processor may be external (e.g., remote) to the vehicle.

In various examples, the second processor may be configured to determine whether the image data has been corrupted based at least in part on the first data integrity value or the second data integrity value. For instance, the second processor may calculate or otherwise determine multiple data integrity values associated with the multiple lines of pixel data, and then compare those data integrity values with the data integrity values appended to each line of the pixel data by the first processor. That is, the second processor may determine, for each line of pixel data of the multiple lines of pixel data, a corresponding data integrity value that represents a specific combination of pixel data values included within that line of pixel data, and then compare that data integrity value with the appended data integrity value. For instance, in continuing the above example, the second processor may determine a fourth data integrity value representing the first array of pixel data values included within the first line of pixel data, a fifth data integrity value representing the second array of pixel data values included within the second line of pixel data, a sixth data integrity value representing the third array of pixel data values included within the third line of pixel data, and so forth.

In some examples, the second processor may compare the first data integrity value with the fourth data integrity value, the second data integrity value with the fifth data integrity value, the third data integrity value with the sixth data integrity value, and so forth. Based on this comparison, the second processor may determine whether some or all of the image data has been corrupted. For instance, if none of the data integrity values are equal (e.g., the appended data integrity values determined by the first processor and the data integrity values computed by the second processor), then the image data may have been completely corrupted at some point while being sent to the second processor, and the image data may not be usable. However, if only some of the data integrity values are not equal (e.g., only the first and fourth data integrity values from the above example are not equal), then a first portion of the image data may be corrupted while a second portion of the image data may still be correct and/or usable.

In some examples, based at least in part on determining that some or all of the image data has been corrupted, the second processor may send an indication to one or more downstream devices (e.g., CPU of the vehicle or other consumers of the image data) that the image data has been corrupted. In some examples, the indication may indicate, among other things, whether the image data has been corrupted, one or more specific portions of the image data and/or lines of pixel data that have been corrupted, one or more specific portions of the image data and/or lines of pixel data that are correct and/or usable, and/or the like. Additionally, or alternatively, in some examples, a CPU of the vehicle may perform an action based at least in part on receiving the indication of the corrupted image data, such as correcting an error associated with the line of pixel data of the image data and/or associating metadata with the image data indicative of the error associated with the line of pixel data of the image data.

In additional or alternative examples, the second processor or a CPU of the vehicle may determine how many lines of the pixel data of the image data have been corrupted. For instance, the second processor or the CPU may determine a number of lines of the pixel data that have been corrupted, and whether that number of lines is less than, equal to, or greater than a threshold number of corrupted lines. By way of example, if the number of corrupted lines is low (e.g., 1, 2, 3, 4, etc.) and/or less than the threshold, then the second processor may determine to send the image data to a downstream consumer device, regardless of the fact that the image data has been corrupted. Additionally, the second processor and/or the CPU may include an indication that a portion of the image data is corrupted, and which portion (e.g., location) of the image that is. However, if the number of corrupted lines is high (e.g., 10, 15, 20, etc.) and/or greater than the threshold, then the second processor may refrain from sending the corrupted image data to the downstream consumer device. Additionally, portions of the image data that are uncorrupted may still be usable by components of the vehicle for autonomous operation to maintain temporal consistency. For example, rather than discarding a whole frame of image data if one or more corrupted lines exist, part of the frame of image data may still be used if it is only partially corrupted.

The techniques described herein can be implemented in a number of ways. For example, although a per-line data integrity check is generally described herein as having a single check value representing a single line of pixel data (e.g., a 1:1 per-line data integrity check ratio), the per-line data integrity check techniques described herein may include determining a single data integrity value representing two lines of pixel data (e.g., a 1:2 per-line data integrity check ratio), as well as other implementations (e.g., a 1:3 ratio, a 1:4 ratio, a 2:1 ratio, a 3:1 ratio, and so forth). Example implementations are provided below with reference to the following figures. Although discussed in the context of an autonomous vehicle, the techniques described herein can be applied to a variety of systems requiring control and/or interaction with objects in an environment and is not limited to autonomous vehicles. In another example, the systems, methods, and apparatuses can be used in an aviation or in a nautical context.

Furthermore, although many of the examples described herein are with reference to image data, the techniques disclosed herein for using data integrity checks to ensure data protection can be similarly applied in other contexts and/or used for different data types. For example, the techniques described herein could be used for lidar and/or radar data, with data integrity values associated with individual lines and/or spins. Additionally, the techniques could be used for time of flight (ToF) data, audio data, sonar data, etc.

Figure 1:
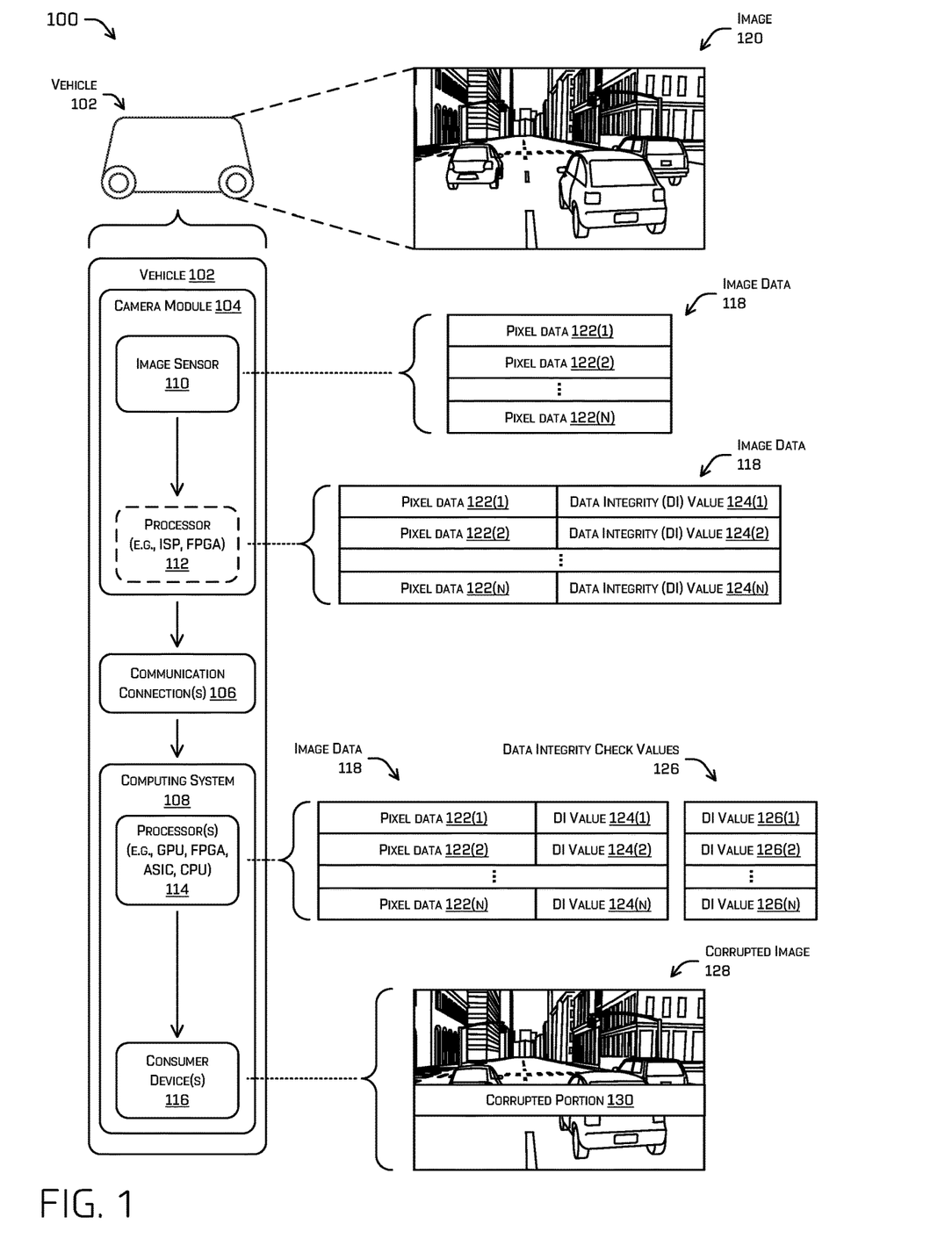
FIG. 1 is a pictorial flow diagram illustrating an example data flow in which a processor of a vehicle camera module performs a per-line data integrity check technique to verify correctness of image data.

FIG. 1 is a pictorial flow diagram illustrating an example data flow 100 in which a processor 112 of a vehicle camera module 104 or a vehicle computing system 108 performs a per-line data integrity check technique to verify correctness of image data 120. As shown in FIG. 1, the vehicle 102 may include a camera module 104, one or more communication connections 106, and a computing system 108.

The camera module 104 of the vehicle 102 may include an image sensor 110. In some examples, the image sensor 110 may capture and/or generate image data 120 representing an image 120. In some instances, the image 120 may comprise an image of a portion of an environment in which the vehicle 102 is operating. The image data 118 may include multiple lines of pixel data 122(1), 122(2), . . . and 122(N) (hereinafter referred to collectively as "pixel data 122") (where N represents any number greater than or equal to one). In some examples, a line of pixel data 122 may include an array of pixel data values representing pixels of the image 120.

After capturing the image data 118, the image sensor 110 may forward the image data 118 to a processor 112 (e.g., an ISP, FPGA, etc.). As shown in FIG. 1, in some examples, the processor 112 may be part of the camera module 104 and, in other examples, the processor 112 may be part of the computing system 108. In some examples, the processor 112 may generate the image data 118 and, in other examples, the processor 112 may receive the image data 118 from the image sensor 110. Using the image data 118 and the pixel data 122, the processor 112 may generate multiple data integrity values 124(1), 124(2), . . . and 124(N) (hereinafter referred to collectively as "data integrity values 124") (where N represents any number greater than or equal to one). The data integrity values 124 may comprise a CRC value, a hash value, a checksum, and/or the like representing arrays of pixel data values included in the pixel data 122. For instance, the data integrity value 124(1) may represent a first array of pixel data values included in the line of pixel data 122(1), the data integrity value 124(2) may represent a second array of pixel data values included in the line of pixel data 122(2), and so forth. In some examples, the processor 112 may use a function to calculate the individual data integrity values 124.

Additionally, in some examples the processor 112 may append the data integrity values 124 to their respective lines of pixel data 122 such that the image data 118 includes the data integrity values 124. By way of example, and not limitation, the data integrity value 124(1) may be appended to an end of the line of pixel data 122(1), the data integrity value 124(2) may be appended to an end of the line of pixel data 122(2), and so forth. In some examples, after the data integrity values 124 are appended to the pixel data 122 of the image data 118, the processor 112 and/or the camera module 104 may send the image data 118 to the computing system 108 of the vehicle 102 via one or more communication connections 106. The communication connections 106 may comprise one or more wired and/or wireless connections, as well as one or more devices, such as switches, routers, serializers, deserializers, and the like.

The computing system 108 of the vehicle 102 may include one or more a processors 114, and one or more consumer devices 116 (e.g., other devices that use the image data 118 and/or the image 120). In some examples, the one or more processors 114 may comprise GPUs, FPGAs, CPUs, and/or the like that is capable of processing the image data 118 on behalf of the computing system 108 of the vehicle 102.

In some examples, the one or more processors 114 may receive the image data 118 from the processor 112 and/or the camera module 104 via the one or more communication connections 106. Additionally, the processors 114 may calculate or otherwise determine multiple data integrity check values 126. The calculation/determination of these data integrity check values 126 may be performed in parallel with one another. The data integrity check values 126 may, similar to the data integrity values 124, comprise CRC values, hash values, parity bits, checksums or other data types representing the arrays of the pixel data values included in the pixel data 122. For instance, the data integrity value 126(1) may represent the first array of pixel data values included in the line of pixel data 122(1), the data integrity check value 126(2) may represent the second array of pixel data values included in the line of pixel data 122(2), and so forth.

After the processor(s) 114 has determined the data integrity check values 126, the processor(s) 114 may then compare the data integrity check values 126 with the data integrity values 124 for each line of pixel data 122. For instance, the processor(s) 114 may compare the data integrity value 124(1) with the data integrity check value 126(1), the data integrity value 124(2) with the data integrity check value 126(2), and so forth. In this way, the processor(s) 114 may determine whether one or more of the lines of pixel data 122 and/or the image data 118 have been corrupted while the image data 118 was being sent from the processor 112 of the camera module 104 to the processor(s) 114 of the computing system 108. For instance, if the image data 118 and/or a line of pixel data 122 has been corrupted, then the data integrity value 124 for a respective line of pixel data 122 will not equal the data integrity check value 126 for that same respective line of pixel data 122. Take, for example, the line of pixel data 122(2). If a corruption has occurred within that line of pixel data 122(2), then the data integrity value 124(2) will not equal the data integrity check value 126(2). However, if no corruption has occurred and the pixel data 122(2) is correct, then the data integrity value 124(2) will be equal to the data integrity check value 126(2).

If the processor(s) 114 detect that corruption has occurred with respect to the image data 118, the processor(s) 114 may identify the portion of the image 120 that has been corrupted based at least in part on the comparison of the data integrity values 124 and the data integrity check values 126. For instance, each line of pixel data 122 may correspond with respective locations within the image 120, and the processor(s) 114 may determine respective locations within the image 120 that are corrupt. That is, by way of example, and not limitation, the line of pixel data 122(1) may correspond with a line of pixels spanning horizontally across the upper-most portion of the image 120, with the line of pixel data 122(2) spanning horizontally across the image 120 directly below the line of pixel data 122(1), and so forth, with the line of pixel data 122(N) corresponding with a line of pixels spanning horizontally across the bottom-most portion of the image 120.

In some examples, the processor(s) 114 may send an indication to one or more consumer devices 116 that the image data 118 has been corrupted, or that the image the consumer devices 116 are receiving comprises a corrupted image 128. Additionally, the processor(s) 114 may indicate a corrupted portion 130 in the corrupted image. In this way, the consumer devices 116 may be aware that the image 120 is corrupted, and the consumer devices 116 can take this into account when determining information from the image data (e.g., detecting objects, classifying objects, segmenting data, tracking objects, determining bounding boxes, etc.) and/or when determining whether or not to cause the vehicle to perform an action (e.g., accelerate, decelerate, turn, change lanes, etc.). In some examples, the one or more consumer devices 116 may be associated with one or more of a perception system of the vehicle, a planning component of the vehicle, and/or the like.

Figure 2:
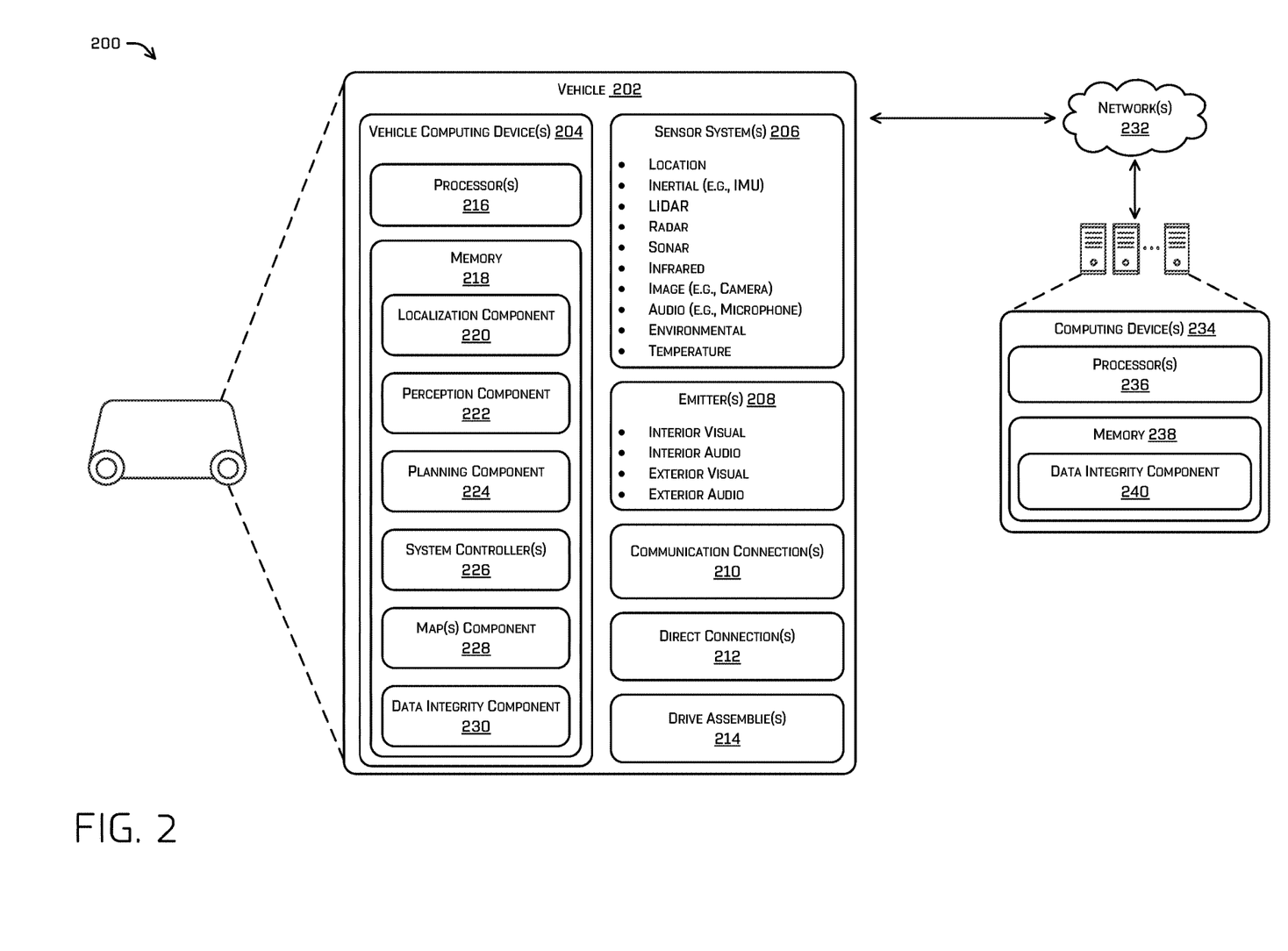
FIG. 2 is a block diagram illustrating an example system for implementing some of the various technologies described herein.

FIG. 2 is a block diagram illustrating an example system 200 for implementing some of the various technologies described herein. In at least one example, the example system 200 may include a vehicle 202, which can be similar to the vehicle 102 described above with reference to FIG. 1. In the illustrated example system 200, the vehicle 202 is an autonomous vehicle; however, the vehicle 202 may be any other type of vehicle.

The vehicle 202 may be a driverless vehicle, such as an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such examples, because the vehicle 202 may be configured to control all functions from start to completion of the trip, including all parking functions, it may not include a driver and/or controls for driving the vehicle 202, such as a steering wheel, an acceleration pedal, and/or a brake pedal. This is merely an example, and the systems and methods described herein may be incorporated into any ground-borne, airborne, or water-borne vehicle, including those ranging from vehicles that need to be manually controlled by a driver at all times, to those that are partially or fully autonomously controlled.

The vehicle 202 may be any configuration of vehicle, such as, for example, a van, a sport utility vehicle, a cross-over vehicle, a truck, a bus, an agricultural vehicle, and/or a construction vehicle. The vehicle 202 may be powered by one or more internal combustion engines, one or more electric motors, hydrogen power, any combination thereof, and/or any other suitable power sources. Although the vehicle 202 has four wheels, the systems and methods described herein may be incorporated into vehicles having fewer or a greater number of wheels, and/or tires. The vehicle 202 may have four-wheel steering and may operate generally with equal or similar performance characteristics in all directions, for example, such that a first end of the vehicle 202 is the front end of the vehicle 202 when traveling in a first direction, and such that the first end becomes the rear end of the vehicle 202 when traveling in the opposite direction. Similarly, a second end of the vehicle 202 is the front end of the vehicle when traveling in the second direction, and such that the second end becomes the rear end of the vehicle 202 when traveling in the opposite direction. These example characteristics may facilitate greater maneuverability, for example, in small spaces or crowded environments, such as parking lots and/or urban areas.

The vehicle 202 may include a computing device(s) 204, one or more sensor system(s) 206, one or more emitter(s) 208, one or more communication connection(s) 210 (also referred to as communication devices and/or modems), at least one direct connection 212 (e.g., for physically coupling with the vehicle 202 to exchange data and/or to provide power), and one or more drive system(s) 214. The one or more sensor system(s) 206 may be configured to capture sensor data (e.g., image data) associated with an environment.

The sensor system(s) 206 may include time-of-flight sensors, location sensors (e.g., GPS, compass, etc.), inertial sensors (e.g., inertial measurement units (IMUs), accelerometers, magnetometers, gyroscopes, etc.), lidar sensors, radar sensors, sonar sensors, infrared sensors, cameras (e.g., RGB, IR, intensity, depth, etc.), microphone sensors, environmental sensors (e.g., temperature sensors, humidity sensors, light sensors, pressure sensors, etc.), ultrasonic transducers, wheel encoders, etc. The sensor system(s) 206 may include multiple instances of each of these or other types of sensors. For instance, the time-of-flight sensors may include individual time-of-flight sensors located at the corners, front, back, sides, and/or top of the vehicle 202. As another example, the camera sensors may include multiple camera modules disposed at various locations about the exterior and/or interior of the vehicle 202. The sensor system(s) 206 may provide input to the computing device(s) 204.

The vehicle 202 may also include one or more emitter(s) 208 for emitting light and/or sound. The one or more emitter(s) 208 in this example include interior audio and visual emitters to communicate with passengers of the vehicle 202. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The one or more emitter(s) 208 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which may comprise acoustic beam steering technology.

The vehicle 202 may also include one or more communication connection(s) 210 that enable communication between the vehicle 202 and one or more other local or remote computing device(s) (e.g., a remote teleoperations computing device) or remote services. For instance, the communication connection(s) 210 may facilitate communication with other local computing device(s) on the vehicle 202 and/or the drive system(s) 214. Also, the communication connection(s) 210 may allow the vehicle 202 to communicate with other nearby computing device(s) (e.g., other nearby vehicles, traffic signals, etc.).

The communications connection(s) 210 may include physical and/or logical interfaces for connecting the computing device(s) 204 to another computing device or one or more external networks 232 (e.g., the Internet). For example, the communications connection(s) 210 may enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.), satellite communication, dedicated short-range communications (DSRC), or any suitable wired or wireless communications protocol that enables the respective computing device to interface with the other computing device(s).

In at least one example, the vehicle 202 may include one or more drive system(s) 214. In some examples, the vehicle 202 may have a single drive system 214. In at least one example, if the vehicle 202 has multiple drive systems 214, individual drive systems 214 may be positioned on opposite ends of the vehicle 202 (e.g., the front and the rear, etc.). In at least one example, the drive system(s) 214 may include one or more sensor system(s) 206 to detect conditions of the drive system(s) 214 and/or the surroundings of the vehicle 202. By way of example and not limitation, the sensor system(s) 206 may include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders may be unique to the drive system(s) 214. In some cases, the sensor system(s) 206 on the drive system(s) 214 may overlap or supplement corresponding systems of the vehicle 202 (e.g., sensor system(s) 206).

The drive system(s) 214 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 214 may include a drive system controller which may receive and preprocess data from the sensor system(s) 206 and to control operation of the various vehicle systems. In some examples, the drive system controller may include one or more processor(s) and memory communicatively coupled with the one or more processor(s). The memory may store one or more modules to perform various functionalities of the drive system(s) 214. Furthermore, the drive system(s) 214 also include one or more communication connection(s) that enable communication by the respective drive system with one or more other local or remote computing device(s).

The computing device(s) 204 may be similar to the vehicle computing device 108 described above with reference to FIG. 1. The computing device(s) 204 may include one or more processor(s) 216 and memory 218 communicatively coupled with the one or more processor(s) 216. In the illustrated example, the memory 218 of the computing device(s) 204 stores a localization component 220, a perception component 222, a planning component 224, one or more system controller(s) 226, a map(s) component 228, and a data integrity component 230. Though depicted as residing in the memory 218 for illustrative purposes, it is contemplated that the localization component 220, the perception component 222, the planning component 224, the one or more system controller(s) 226, the map(s) component 228, and the data integrity component 230 may additionally, or alternatively, be accessible to the computing device(s) 204 (e.g., stored in a different component of vehicle 202 and/or be accessible to the vehicle 202 (e.g., stored remotely).

In the memory 218 of the computing device(s) 204, the localization component 220 may include functionality to receive data from the sensor system(s) 206 to determine a position of the vehicle 202. For example, the localization component 220 may include and/or request/receive a three-dimensional map of an environment and may continuously determine a location of the autonomous vehicle within the map. In some instances, the localization component 220 may use SLAM (simultaneous localization and mapping) or CLAMS (calibration, localization and mapping, simultaneously) to receive time-of-flight data, image data, lidar data, radar data, sonar data, IMU data, GPS data, wheel encoder data, or any combination thereof, and the like to accurately determine a location of the autonomous vehicle. In some instances, the localization component 220 may provide data to various components of the vehicle 202 to determine an initial position of an autonomous vehicle for generating a trajectory, as discussed herein. In at least one example, the localization component 220 may determine a location of a simulated vehicle within a simulated environment and/or determine a closest prior location of a vehicle that recorded log data of which the simulated environment is based on.

The perception component 222 may include functionality to perform object detection, segmentation, and/or classification. In some examples, the perception component 222 may provide processed sensor data that indicates a presence of an entity that is proximate to the vehicle 202 and/or a classification of the entity as an entity type (e.g., car, pedestrian, cyclist, building, tree, road surface, curb, sidewalk, unknown, etc.). In additional and/or alternative examples, the perception component 222 may provide processed sensor data that indicates one or more characteristics associated with a detected entity and/or the environment in which the entity is positioned. In some examples, characteristics associated with an entity may include, but are not limited to, an x-position (global position), a y-position (global position), a z-position (global position), an orientation, an entity type (e.g., a classification), a velocity of the entity, an extent of the entity (size), etc. Characteristics associated with the environment may include, but are not limited to, a presence of another entity in the environment, a state of another entity in the environment, a time of day, a day of a week, a season, a weather condition, an indication of darkness/light, etc.

The perception component 222 may include functionality to store perception data generated by the perception component 222. In some instances, the perception component 222 may determine a track corresponding to an object that has been classified as an object type. For purposes of illustration only, the perception component 222, using sensor system(s) 206 may capture one or more images of an environment. The sensor system(s) 206 may capture images of an environment that includes an object, such as a building, vehicle, trees, streetlights, pedestrians, etc.

The stored perception data may, in some examples, include fused perception data captured by the vehicle. Fused perception data may include a fusion or other combination of sensor data from sensor system(s) 206, such as image sensors, lidar sensors, radar sensors, time-of-flight sensors, sonar sensors, global positioning system sensors, internal sensors, and/or any combination of these. The stored perception data may additionally or alternatively include classification data including semantic classifications of objects (e.g., pedestrians, vehicles, buildings, road surfaces, etc.) represented in the sensor data.

The perception component 222 is an example of the consumer devices 116 that may receive the image data 118, as described in FIG. 1. The perception component 222 may receive an indication of the corrupted data and make determinations (e.g., detection, classification, segmentation, tracking, etc.) based on the corruption. For example, an indication of corruption can lower a confidence value of a detection, change a threshold for making a determination, and/or the like.

The planning component 224 may determine a path for the vehicle 202 to follow to traverse through an environment. For example, the planning component 224 may determine various routes and paths and various levels of detail. In some instances, the planning component 224 may determine a route to travel from a first location (e.g., a current location) to a second location (e.g., a target location). For the purpose of this discussion, a route may be a sequence of waypoints for traveling between two locations. As non-limiting examples, waypoints include streets, intersections, global positioning system (GPS) coordinates, etc. Further, the planning component 224 may generate an instruction for guiding the autonomous vehicle along at least a portion of the route from the first location to the second location. In at least one example, the planning component 224 may determine how to guide the autonomous vehicle from a first waypoint in the sequence of waypoints to a second waypoint in the sequence of waypoints. In some examples, the instruction may be a path, or a portion of a path. In some examples, multiple paths may be substantially simultaneously generated (i.e., within technical tolerances) in accordance with a receding horizon technique. A single path of the multiple paths in a receding data horizon having the highest confidence level may be selected to operate the vehicle.

In other examples, the planning component 224 may alternatively, or additionally, use data from the perception component 222 to determine a path for the vehicle 202 to follow to traverse through an environment. For example, the planning component 224 may receive data from the perception component 222 regarding objects associated with an environment. Using this data, the planning component 224 may determine a route to travel from a first location (e.g., a current location) to a second location (e.g., a target location) to avoid objects in an environment. In at least some examples, such a planning component 224 may determine there is no such collision free path and, in turn, provide a path which brings vehicle 202 to a safe stop avoiding all collisions and/or otherwise mitigating damage.

In at least one example, the computing device(s) 204 may include one or more system controller(s) 226, which may be configured to control steering, propulsion, braking, safety, emitters, communication, and other systems of the vehicle 202. These system controller(s) 226 may communicate with and/or control corresponding systems of the drive system(s) 214 and/or other components of the vehicle 202, which may be configured to operate in accordance with a path provided from the planning component 224.

The memory 218 may further include the map(s) component 228 to maintain and/or update one or more maps (not shown) that can be used by the vehicle 202 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map can include a three-dimensional mesh of the environment. In some instances, the map can be stored in a tiled format, such that individual tiles of the map represent a discrete portion of an environment and can be loaded into working memory as needed. In at least one example, the one or more maps can include at least one map (e.g., images and/or a mesh). In some examples, the vehicle 202 can be controlled based at least in part on the maps. That is, the maps can be used in connection with the localization component 220, the perception component 222, and/or the planning component 224 to determine a location of the vehicle 202, identify objects in an environment, and/or generate routes and/or trajectories to navigate within an environment.

In some examples, the one or more maps can be stored on a remote computing device(s) (such as the computing device(s) 234) accessible via network(s) 232. In some examples, multiple maps can be stored based on, for example, a characteristic (e.g., type of entity, time of day, day of week, season of the year, etc.). Storing multiple maps can have similar memory requirements but increase the speed at which data in a map can be accessed.

The memory 218 of the vehicle computing devices 204 may additionally include the data integrity component 230. The data integrity component 230 may be used by the processors 216 and/or the vehicle computing devices 204 in order to perform the per-line data integrity check and/or the full-frame data integrity check techniques disclosed herein. For instance, the data integrity component 230 may include one or more hashing functions that may be used in order to generate, calculate, or otherwise determine data integrity values for a respective set of pixel data values. Additionally, the data integrity component 230 may include threshold values associated with image data corruption. For instance, the data integrity component 230 may include a minimum threshold that indicates a number of lines of pixel data that should be corrupt before determining to refraining from sending image data to a downstream consumer device.

The vehicle 202 may connect to computing device(s) 234 via network(s) 232 and may include one or more processor(s) 236 and memory 238 communicatively coupled with the one or more processor(s) 236. In at least one instance, the one or more processor(s) 236 may be similar to the processor(s) 216 and the memory 238 may be similar to the memory 218. In the illustrated example, the memory 238 of the computing device(s) 234 stores a data integrity component 240. Though depicted as residing in the memory 238 for illustrative purposes, it is contemplated that the data integrity component 240 may additionally, or alternatively, be accessible to the computing device(s) 234 (e.g., stored in a different component of computing device(s) 234 and/or be accessible to the computing device(s) 234 (e.g., stored remotely).

In the memory 238 of the computing device(s) 234, the data integrity component 240 may be used in order to perform the per-line data integrity check and/or the full-frame data integrity check techniques disclosed herein. For instance, the data integrity component 230 may include one or more hashing functions that may be used in order to generate, calculate, or otherwise determine data integrity values for a respective set of pixel data values.

The processor(s) 216 of the computing device(s) 204 and the processor(s) 236 of the computing device(s) 234 may be any suitable processor capable of executing instructions to process data and perform operations as described herein. By way of example and not limitation, the processor(s) 216 and 236 may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

The memory 218 of the computing device(s) 204 and the memory 238 of the computing device(s) 234 are examples of non-transitory computer-readable media. The memory 218 and 238 may store an operating system and one or more software applications, instructions, programs, and/or data to implement the methods described herein and the functions attributed to the various systems. In various implementations, the memory 218 and 238 may be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, aspects of some or all of the components discussed herein may include any models, algorithms, and/or machine learning algorithms. For example, in some instances, the components in the memory 218 and 238 may be implemented as one or more neural network(s).

Figure 3:
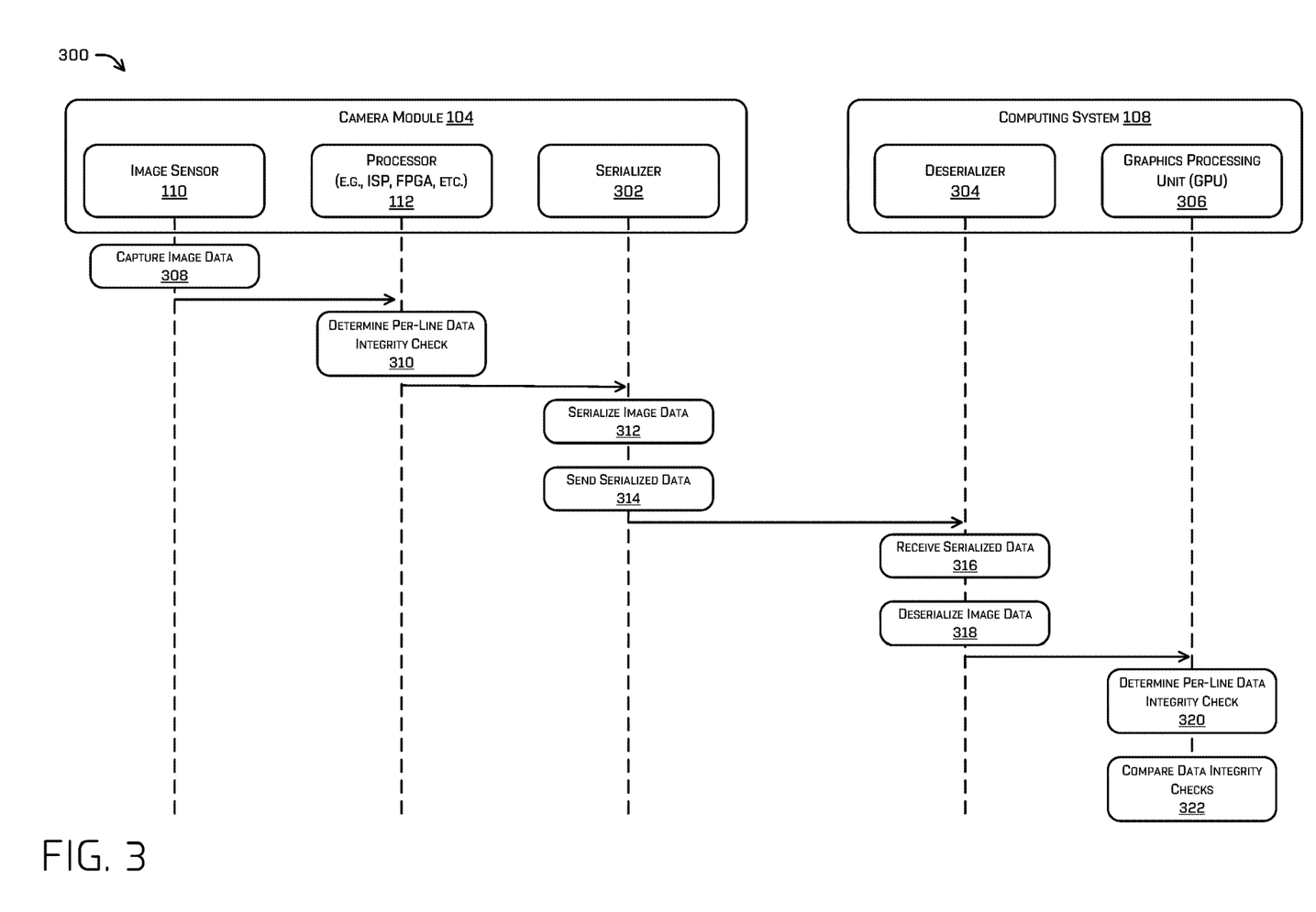
FIG. 3 illustrates an example data flow in which a per-line data integrity check technique is used to verify correctness of image data.

FIG. 3 illustrates an example data flow 300 in which a per-line data integrity check technique is used to verify correctness of image data. At 308, the image sensor 110 of the camera module 104 may capture image data. The image data may include multiple lines of pixel data. The image data and/or the multiple lines of pixel data may represent an image captured by the image sensor 110.

At 310, the processor 112 of the camera module 104 may determine a per-line data integrity check associated with the lines of pixel data of the image data. That is, the processor 112 may calculate, generate, or otherwise determine multiple data integrity values (e.g., CRC check values, hash values, checksums, etc.) associated with the multiple lines of pixel data. For instance, the processor 112 may determine, for each line of pixel data of the multiple lines of pixel data, a corresponding data integrity value that represents a specific combination of pixel data values included within that line of pixel data. The processor 112 may append the per-line data integrity check to the image data.

At 312, a serializer 302 of the camera module 104 may serialize the image data such that the image data can be sent from the camera module 104 to the computing system 108 via a communication connection. For instance, the communication connection may comprise a serial connection. At 314, the serializer 302 of the camera module 104 may send the serialized image data to a deserializer 304 of the computing system 108. At 316, the deserializer 304 may receive the serialized image data and, at 318, the deserializer 304 may deserialize the image data.

At 320, a graphics processing unit (GPU) 306 (or another type of parallelized processing unit) of the computing system 108 may determine a per-line data integrity check for the pixel data of the image data. For instance, the GPU may calculate or otherwise determine multiple data integrity values (e.g., CRC check values, hash values, etc.) associated with the multiple lines of pixel data, and, at 322, the GPU may compare those data integrity values with the data integrity values appended to each line of the pixel data by the processor 112. That is, the GPU may determine, for each line of pixel data of the multiple lines of pixel data, a corresponding data integrity value that represents a specific combination of pixel data values included within that line of pixel data, and then compare that data integrity value with the appended data integrity value. In this way, if the GPU determines that any of the data integrity values do not match for a respective line of pixel data, then the image data may have been corrupted.

Figure 4:
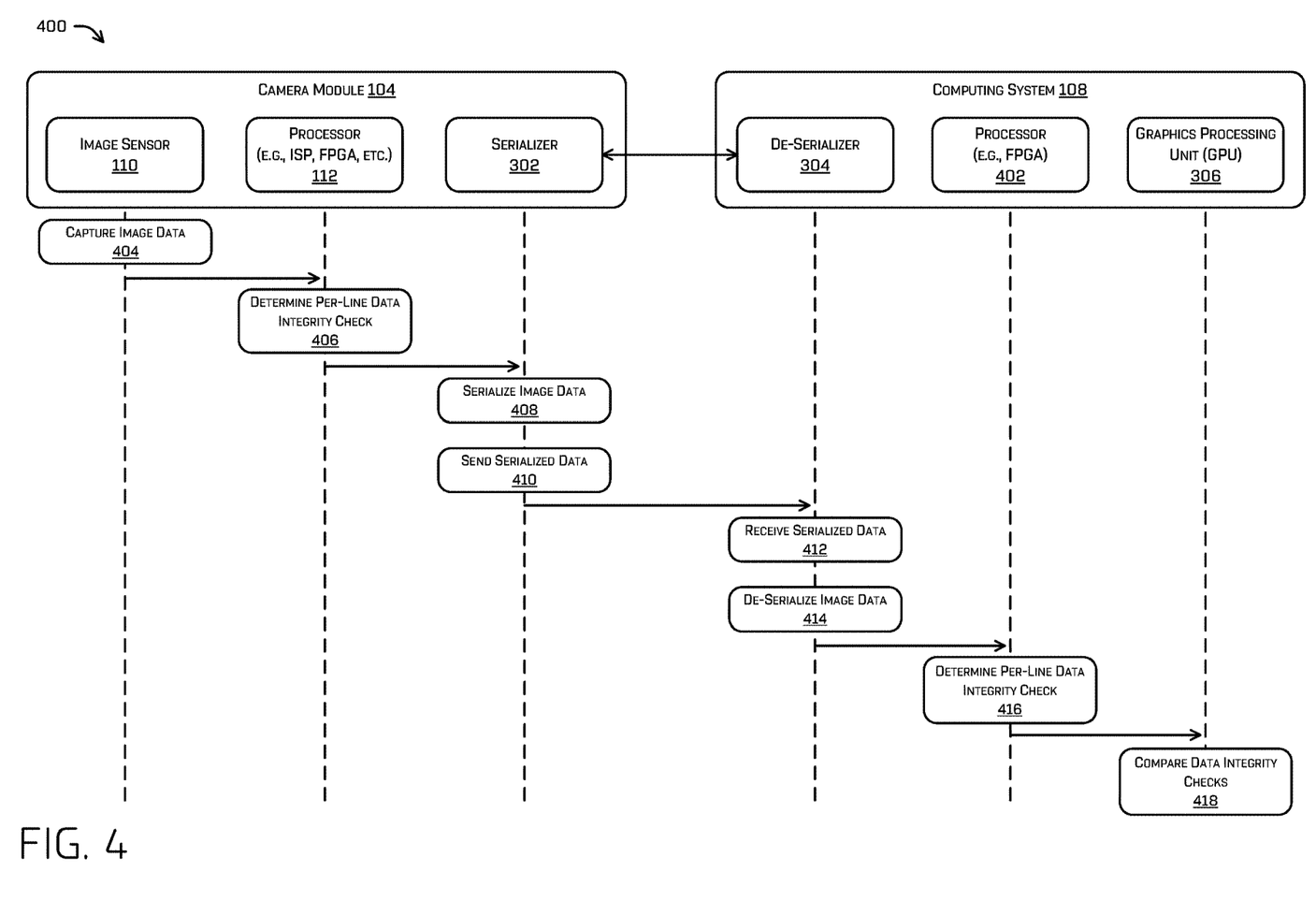
FIG. 4 illustrates another example data flow in which a per-line data integrity check technique is used to verify correctness of image data.

FIG. 4 illustrates another example data flow 400 in which a per-line data integrity check technique is used to verify correctness of image data. At 404, the image sensor 110 of the camera module 104 may capture image data. The image data may include multiple lines of pixel data. The image data and/or the multiple lines of pixel data may represent an image captured by the image sensor 110.

At 406, the processor 112 of the camera module 104 may determine a per-line data integrity check associated with the lines of pixel data of the image data. That is, the processor 112 may calculate, generate, or otherwise determine multiple data integrity values associated with the multiple lines of pixel data. For instance, the processor 112 may determine, for each line of pixel data of the multiple lines of pixel data, a corresponding data integrity value that represents a specific combination of pixel data values included within that line of pixel data. The processor 112 may append the per-line data integrity check to the image data.

At 408, a serializer 302 of the camera module 104 may serialize the image data such that the image data can be sent from the camera module 104 to the computing system 108 via a communication connection. For instance, the communication connection may comprise a serial connection. At 410, the serializer of the camera module 104 may send the serialized image data to a deserializer 304 of the computing system 108. At 412, the deserializer 304 may receive the serialized image data and, at 414, the deserializer 304 may deserialize the image data.

At 416, a processor 402 of the computing system 108 may determine a per-line data integrity check for the pixel data of the image data. For instance, the processor may calculate or otherwise determine multiple data integrity values associated with the multiple lines of pixel data. Finally, at 418, the GPU 306 may compare the data integrity values to determine whether the image data file has been corrupted. In examples, the processors 112 and 402 may comprise high-assurance devices whose rates of error (e.g. rate at which a bit flip may occur while computing a CRC) is less than a threshold rate (e.g., lower chance of error), while the GPU 306 may comprise a low-assurance device whose rate of error is greater than a threshold rate (e.g., higher chance of error). As such, the high-assurances devices (e.g., processors 112 and 402) may be used for higher priority or higher complexity computations, such as computing data integrity values, while the low assurance device (e.g., GPU 306) may be used for lower priority or lower complexity computations, such as comparing data integrity values. In some examples, the threshold rate may be associated with a percentage chance that a bit-flip error may occur in a computation (e.g., 5%, 10%, 20%, 30%, etc.), based on a time or rate associated with a bit flip error occurrence (e.g., once per cycle, once per second, once per minute, once per day, and so forth), and the like.

Figure 5A:
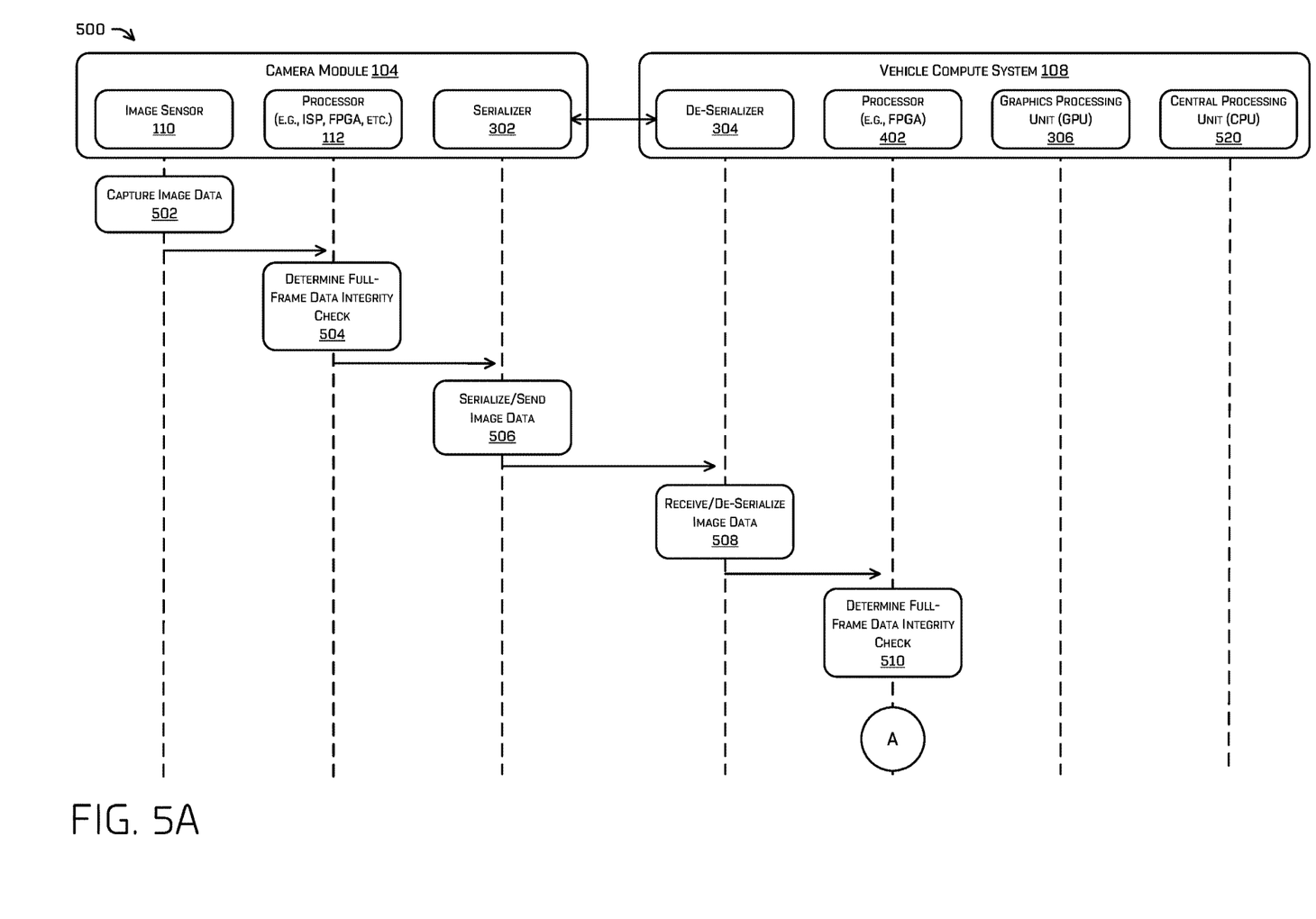
FIGS. 5A and 5B collectively illustrate yet another example data flow in which a per-line data integrity check technique and a full-frame data integrity check technique are used in parallel to verify correctness of image data.
Figure 5B:
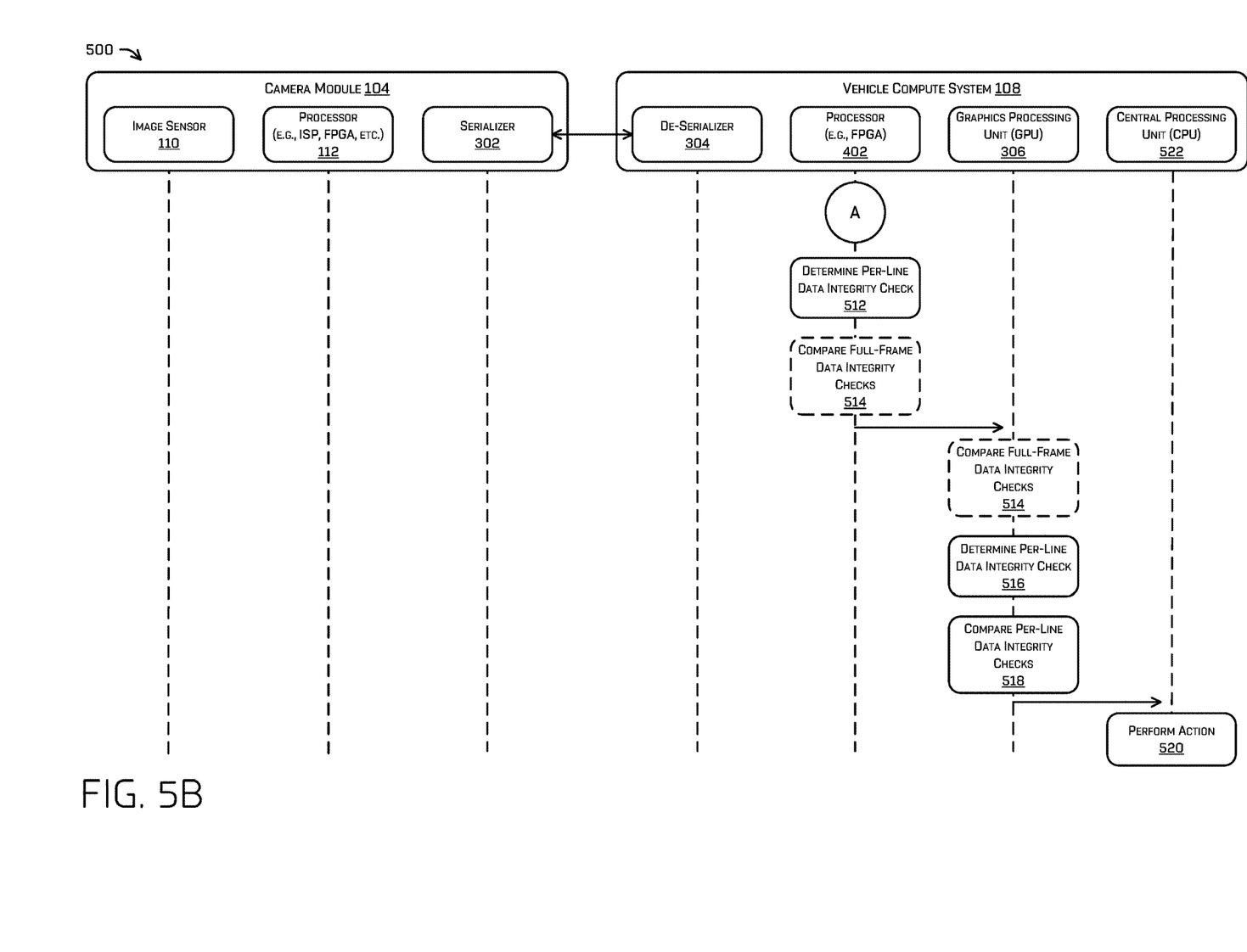

FIGS. 5A and 5B collectively illustrate yet another example data flow in which a per-line data integrity check technique and a full-frame data integrity check technique are used in parallel to verify correctness of image data. At 502, the image sensor 110 of the camera module 104 may capture image data. The image data may include multiple lines of pixel data. The image data and/or the multiple lines of pixel data may represent an image captured by the image sensor 110.

At 504, the processor 112 of the camera module 104 may determine a first full-frame data integrity check associated with the image data. That is, the processor 112 may calculate, generate, or otherwise determine a first data integrity value representing the pixel data of the image data. At 506, a serializer 302 of the camera module 104 may serialize and send the image data from the camera module 104 to the computing system 108 via a communication connection. For instance, the communication connection may comprise a serial connection. The serializer of the camera module 104 may send the serialized image data to a deserializer 304 of the computing system 108. At 508, the deserializer 304 may receive the serialized image data and deserialize the image data.

At 510, a processor 402 of the computing system 108 may determine a second full-frame data integrity check associated with the image data that will be compared with the first full-frame data integrity check. That is, the processor 402 may calculate, generate, or otherwise determine a second data integrity value representing the pixel data of the image data. Continuing on to FIG. 5B, at 512, the processor 402 of the computing system 108 may determine a first per-line data integrity check for the pixel data of the image data. For instance, the processor 402 may calculate or otherwise determine a first set of multiple data integrity values associated with the multiple lines of pixel data. In some examples, at 514 the processor 402 may optionally compare the full-frame data integrity checks to determine whether the image data is corrupt. Additionally, or alternatively, the processor 402 may send the image data, including the first full-frame data integrity check, the second full-frame data integrity check, and the first per-line data integrity check to the GPU 306, and the GPU 306 may compare the full-frame data integrity checks (block 514) to determine whether the image data is corrupt.

At 516, the GPU 306 may determine a second per-line data integrity check that will be compared with the first per-line data integrity check. At 518, the GPU 306 may compare the first per-line data integrity check (appended by the processor 402) with the second per-line data integrity check that the GPU 306, itself, determined. By comparing the data integrity check values in this way, the GPU 306 may verify whether the image data has been corrupted at all after it was sent by the processor 112. At 520, a central processing unit (CPU) 522 may perform an action based at least in part on the comparisons of the data integrity values. For instance, if the data integrity checks (either the full-frame or the per-line) are not equal because the image data has been corrupted, the CPU 522 may refrain from sending the image data to downstream consumer devices. Additionally, or alternatively, the CPU 522 may associate metadata with the image data indicating that the image data has been corrupted and/or indicating a specific portion or region of the image data that has been corrupted. Additionally, or alternatively, the CPU 522 may perform a corrective action to fix the corrupted image data, determine whether the image data contains portions or regions that are correct and/or usable to control an autonomous vehicle, and the like. In some examples, a difference between expected and received full frame data integrity values can be used to determine if further data integrity checks (e.g., per-line data integrity checks) should be performed. For example, a number or pattern of different bits between an expected and received full frame integrity value can be used to characterize or otherwise determine a level of corruption of received data to determine if portions of the data may be salvaged through use of a per-line data integrity check, for example.

In some examples, if comparing the full-frame data integrity checks reveals a corruption has occurred, but the comparing the per-line data integrity checks does not reveal the corruption, this may indicate that the corruption occurred somewhere between the processor 112 and the processor 402. Additionally, if comparing the full-frame data integrity checks does not reveal that a corruption has occurred, but the comparing the per-line data integrity checks does reveal that a corruption has occurred, this may indicate that the corruption occurred between the processor 402 and the GPU 306.

Figure 6:
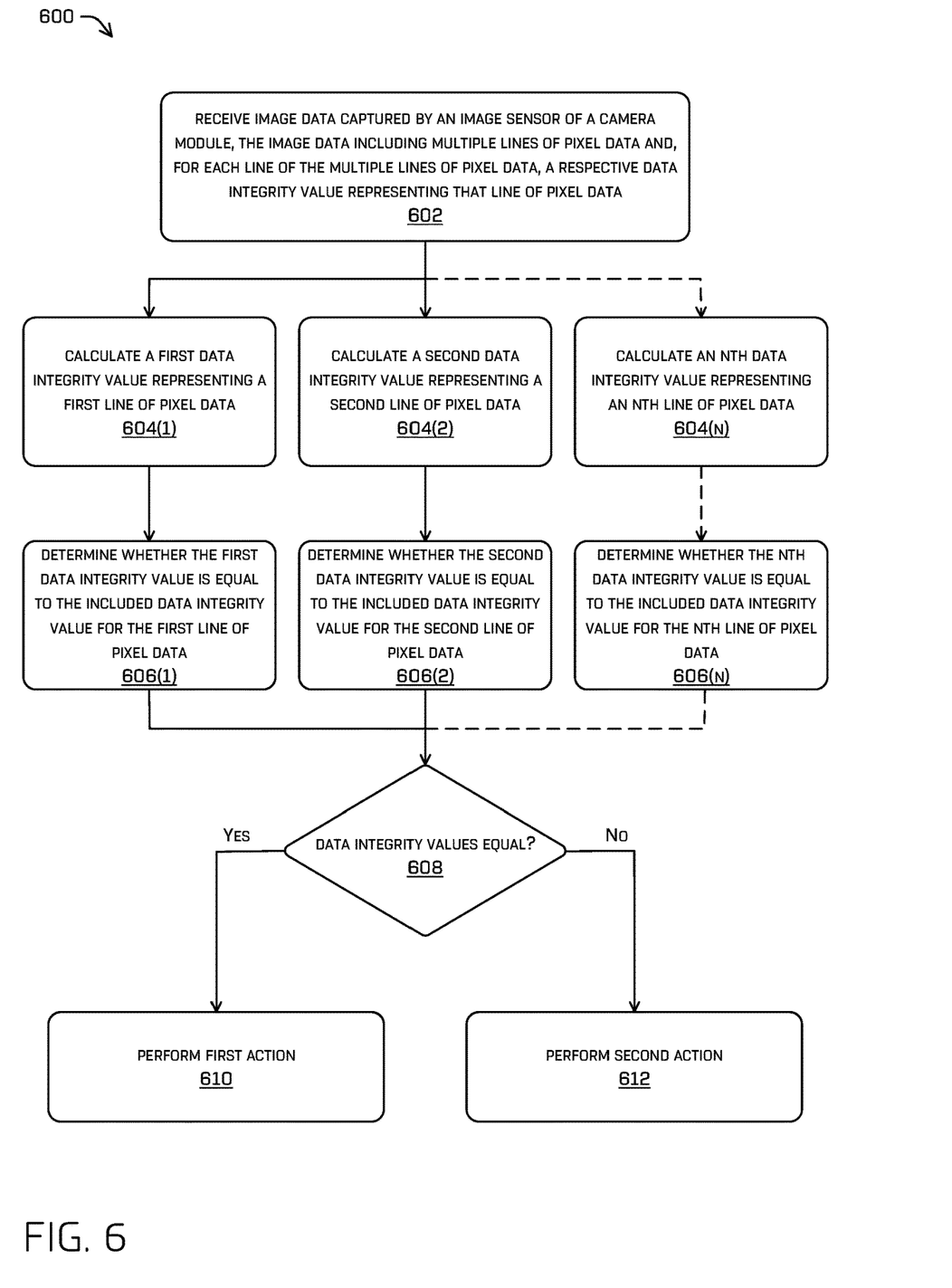
FIG. 6 is a flowchart illustrating an example method for using a per-line data integrity check technique to determine whether image data has been corrupted.

FIG. 6 is a flowchart illustrating an example method 600 for using a per-line data integrity check technique to determine whether image data has been corrupted. The method 600 illustrated in FIG. 6 is described with reference to one or more of the vehicles and/or systems described in FIGS. 1-5 for convenience and ease of understanding. However, the method 600 illustrated in FIG. 6 is not limited to being performed using the vehicles, systems, and/or techniques described in FIGS. 1-5, and may be implemented using any of the other vehicles, systems, and technologies described in this application, as well as vehicles, systems, and technologies other than those described herein. Moreover, the vehicles, systems, and user interfaces described herein are not limited to performing the method 600 illustrated in FIG. 6.

The method 600 is illustrated as a collection of blocks in a logical flow graph, which represents sequences of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some examples, one or more blocks of the process may be omitted entirely. Moreover, the method 600 may be combined in whole or in part with other methods described herein.

The method 600 begins at operation 602, which includes receiving image data captured by an image sensor of a camera module. The image data may include multiple lines of pixel data and, for each line of the multiple lines of pixel data, a respective hash value representing that line of pixel data. For instance, the processor 114 of the computing system 108 of the vehicle 102 may receive the image data. The image data may be similar to the image data 118 that comprises one or more lines of pixel data 122 and one or more data integrity values 124.

At operations 604(1), 604(2), and 604(N) (where N represents any number greater than or equal to one), the method 600 includes calculating, in parallel, data integrity values representing respective lines of the multiple lines of pixel data. For instance, operation 604(1) includes calculating a first data integrity value (e.g., data integrity value 126(1)) representing a first line of pixel data (e.g., pixel data 122(1)), operation 604(2) includes calculating a second data integrity value (e.g., data integrity value 126(2)) representing a second line of pixel data (e.g., pixel data 122(2)), and so forth for a number of N lines of pixel data. As noted, these calculations may be performed in parallel or substantially parallel by, for instance, the processor 114.

At operations 606(1), 606(2), and 606(N) (where N represents any number greater than or equal to one), the method 600 includes determining, in parallel, whether the calculated data integrity values equal the included data integrity values that were received with each line of the pixel data. For instance, the processor 114 may perform operation 606(1) to determine whether the first data integrity value (e.g., data integrity value 126(1)) is equal to the included data integrity value (e.g., data integrity value 124(1)) for the first line of pixel data (e.g., pixel data 122(1)). Additionally, the processor 114 may similarly perform operation 606(2) in parallel with operation 606(1) to determine whether the second data integrity value (e.g., data integrity value 126(2)) is equal to the included data integrity value (e.g., data integrity value 124(2)) for the second line of pixel data (e.g., pixel data 122(2)), and so forth for a number of N lines of pixel data.

At operation 608, if the compared data integrity values are equal or, in some examples, substantially equal (e.g., less than a threshold of difference) then the method 600 may proceed on to operation 610. However, if the compared data integrity values are not equal or, in some examples, more than a threshold amount of the data integrity values are not equal, then the method 600 may proceed on to operation 612.

At operation 610, the method 600 includes performing a first action. Performing the first action may be based at least in part on the compared data integrity values being equal, or substantially equal. That is, in some examples, the first action may be performed if only a few of the lines of the pixel data are corrupt (e.g., 1, 2, 3, etc.). Additionally, the first action may be performed if all of the data integrity values are equal (e.g., no corruption). In some examples, performing the first action may include sending the image data to a downstream consumer device.

At operation 612, the method 600 includes performing a second action. Performing the second action may be based at least in part on the compared data integrity values not being equal, or if more than a threshold amount of the data integrity values are not equal. For instance, in some examples, the second action may be performed if some or all of the lines of pixel data are corrupt. In examples, performing the second action may include sending an indication of the image data corruption to a downstream consumer device, refraining from sending the corrupted image data to the downstream consumer device, indicating a location (e.g., respective lines of pixel data) of the corruption in the image data for the downstream consumer device, and the like.

EXAMPLE CLAUSES

A. A system comprising: one or more processors; and one or more non-transitory computer-readable media storing instructions that, when executed, cause the one or more processors to perform operations comprising: receiving image data from an image sensor associated with a vehicle; determining, by a first processor, a first cyclic redundancy check (CRC) associated with a line of the image data; sending the image data and the first CRC to a graphics processing unit (GPU); generating, by the GPU, a second CRC associated with the line of the image data; determining that the first CRC does not equal the second CRC; and at least one of: correcting an error associated with the line of the image data; or associating metadata with the image data indicative of the error associated with the line of the image data.

B. The system as recited in paragraph A, wherein: the image data comprises multiple lines of pixel data, and determining the first CRC comprises determining respective CRC values for each one of the multiple lines of pixel data, wherein a first respective CRC value represents pixel data values included in a first line of pixel data.

C. The system as recited in paragraphs A-B, the operations further comprising: determining, by a second processor, a third CRC associated with a full frame of the image data; determining, by the first processor, a fourth CRC associated with the full frame of the image data; and comparing, by the GPU, the third CRC with the fourth CRC.

D. The system as recited in any one of paragraphs A-C, wherein the line of the image data comprises a first line of the image data, the operations further comprising: generating, by the GPU, respective CRCs associated with respective lines of the image data, the respective CRCs including the second CRC associated with the first line of the image data and a third CRC associated with a second line of the image data; and wherein the second CRC is generated contemporaneously with the third CRC.

E. A method comprising: receiving, at a first processor unit, image data and multiple data integrity values, the multiple data integrity values including a first data integrity value corresponding to a first portion of the image data and a second data integrity value corresponding to a second portion of the image data; determining, by the first processor unit, a third data integrity value corresponding to the first portion of the image data; determining, by the first processor unit and based at least in part on the first data integrity value and the third data integrity value, that the first portion of the image data is corrupt; and performing an action based at least in part on determining that the first portion of the image data is corrupt.

F. The method as recited in paragraph E, wherein the first processor unit is a parallel processor unit that is configured to calculate multiple data integrity values contemporaneously, each data integrity value of the multiple data integrity values corresponding to a different portion of the image data.

G. The method as recited in paragraphs E-F, wherein: the first portion of the image data comprises a line of pixel data of the image data, and the first data integrity value comprises one or a cyclic redundancy check (CRC) value, a hash value, a checksum value, or a parity bit representing a combination of pixel data values included within the line of pixel data.

H. The method as recited in any one of paragraphs E-G, wherein determining that the portion of the image data is corrupt is based at least in part on determining that the first data integrity value does not equal the third data integrity value.

I. The method as recited in any one of paragraphs E-H, further comprising: determining a size of a corrupted region of an image, wherein a portion of the corrupted region is represented by the first portion of the image data that is corrupt; and wherein performing the action is further based at least in part on the size of the corrupted region meeting or exceeding a threshold size.

J. The method as recited in any one of paragraphs E-I, wherein performing the action comprises at least one of: correcting the first portion of the image data that is corrupt, associating metadata with the image data indicative of the first portion of the image data that is corrupt, or refraining from sending the image data to a consumer device.

K. The method as recited in any one of paragraphs E-J, wherein the image data further includes: a fourth data integrity value representing a full frame of the image data, the fourth data integrity value determined by a second processor unit, and a fifth data integrity value representing the full frame of the image data, the fifth data integrity value determined by a third processor unit.

L. The method as recited in any one of paragraphs E-K, further comprising determining, by the first processor unit, that the image data is corrupt based at least in part on the fourth data integrity value not being equal to the fifth data integrity value.

M. The method as recited in any one of paragraphs E-L, wherein the first processor unit is a parallelized processor unit that is associated with a vehicle and the image data is received from a camera module of the vehicle, the method further comprising determining that the corrupt first portion of the image data is associated with transmission of the image data via a communication connection between the camera module and the first processor unit.

N. The method as recited in any one of paragraphs E-M, wherein: the first processor unit is associated with a first assurance level in which a probability of a computing error is associated with a first level, and the action is performed by a second processor unit that is associated with a second assurance level in which the probability of the computing error is associated with a second level that is less than the first level.

O. One or more non-transitory computer-readable media storing instructions that, when executed by one or more processors, cause the one or more processors to perform operations comprising: receiving image data and multiple data integrity values, the multiple data integrity values including a first data integrity value corresponding to a first portion of the image data and a second data integrity value corresponding to a second portion of the image data; determining a third data integrity value corresponding to the first portion of the image data; determining, based at least in part on the first data integrity value and the third data integrity value, that the first portion of the image data is corrupt; and performing an action based at least in part on determining that the first portion of the image data is corrupt.

P. The one or more non-transitory computer-readable media as recited in paragraph O, wherein: the first portion of the image data comprises a line of pixel data of the image data, and the first data integrity value comprises one of a cyclic redundancy check (CRC) value, a hash value, a checksum value, or a parity bit representing a combination of pixel data values included within the line of pixel data.

Q. The one or more non-transitory computer-readable media as recited in paragraphs O-P, wherein determining that the first portion of the image data is corrupt is based at least in part on determining that the first data integrity value does not equal the third data integrity value.

R. The one or more non-transitory computer-readable media as recited in any one of paragraphs O-Q, wherein performing the action comprises at least one of: correcting the first portion of the image data that is corrupt, associating metadata with the image data indicative of the first portion of the image data that is corrupt, or refraining from sending the image data to a consumer device.

S. The one or more non-transitory computer-readable media as recited in any one of paragraphs O-R, by a first processor unit, that the first portion of the image data is corrupt based at least in part on a fourth data integrity value not being equal to a fifth data integrity value, the fourth data integrity value and the fifth data integrity value included in the multiple hash values, wherein: the fourth data integrity value represents a full frame of the image data, the fourth data integrity value determined by a second processor unit, and the fifth data integrity value represents the full frame of the image data, the fifth data integrity value determined by a third processor unit.

T. The one or more non-transitory computer-readable media as recited in any one of paragraphs O-S, the operations further comprising: determining a fourth data integrity value representing the second portion of the image data; and determining, based at least in part on the second data integrity value and the fourth data integrity value, that the second portion of the image data is correct.

While the example clauses described above are described with respect to one particular implementation, it should be understood that, in the context of this document, the content of the example clauses may also be implemented via a method, device, system, computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
one or more processors; and
one or more non-transitory computer-readable media storing instructions that, when executed, cause the one or more processors to perform operations comprising:
receiving image data from an image sensor associated with a vehicle;
determining, by a first processor, a first cyclic redundancy check (CRC) associated with a line of the image data, wherein the first processor is associated with a first assurance level in which a probability of a computing error is associated with a first level;
sending the image data and the first CRC to a graphics processing unit (GPU), wherein the GPU is associated with a second assurance level in which the probability of the computing error is associated with a second level that is less than the first level;
generating, by the GPU, a second CRC associated with the line of the image data;
determining that the first CRC does not equal the second CRC; and
at least one of:
correcting an error associated with the line of the image data; or
associating metadata with the image data indicative of the error associated with the line of the image data.

2. The system of claim 1, wherein:
the image data comprises multiple lines of pixel data, and
determining the first CRC comprises determining respective CRC values for each one of the multiple lines of pixel data, wherein a first respective CRC value represents pixel data values included in a first line of pixel data.

3. The system of claim 1, the operations further comprising:
determining, by a second processor, a third CRC associated with a full frame of the image data;
determining, by the first processor, a fourth CRC associated with the full frame of the image data; and
comparing, by the GPU, the third CRC with the fourth CRC.

4. The system of claim 1, wherein the line of the image data comprises a first line of the image data, the operations further comprising:
generating, by the GPU, respective CRCs associated with respective lines of the image data, the respective CRCs including the second CRC associated with the first line of the image data and a third CRC associated with a second line of the image data; and
wherein the second CRC is generated contemporaneously with the third CRC.

5. The system of claim 1, wherein determining that the first CRC does not equal the second CRC includes determining, based at least in part on a difference between the first CRC and the second CRC, that sending the image data via a data path caused the error associated with the line of the image data.

6. A method comprising:
receiving, at a first processor unit, image data and multiple data integrity values, the multiple data integrity values including a first data integrity value corresponding to a first portion of the image data and a second data integrity value corresponding to a second portion of the image data;
determining, by the first processor unit, a third data integrity value corresponding to the first portion of the image data, wherein the first processor unit is associated with a first assurance level in which a probability of a computing error is associated with a first level;
determining, by the first processor unit and based at least in part on the first data integrity value and the third data integrity value, that the first portion of the image data is corrupt; and
performing an action based at least in part on determining that the first portion of the image data is corrupt, wherein the action is performed by a second processor unit that is associated with a second assurance level in which the probability of the computing error is associated with a second level that is less than the first level.

7. The method of claim 6, wherein the first processor unit is a parallel processor unit that is configured to process multiple data integrity values contemporaneously, each data integrity value of the multiple data integrity values corresponding to a different portion of the image data.

8. The method of claim 6, wherein:
the first portion of the image data comprises a line of pixel data of the image data, and
the first data integrity value comprises one of a cyclic redundancy check (CRC) value, a hash value, a checksum value, or a parity bit representing a combination of pixel data values included within the line of pixel data.

9. The method of claim 6, wherein determining that the first portion of the image data is corrupt is based at least in part on determining that the first data integrity value does not equal the third data integrity value.

10. The method of claim 6, further comprising:
determining a size of a corrupted region of an image, wherein a portion of the corrupted region is represented by the first portion of the image data that is corrupt; and
wherein performing the action is further based at least in part on the size of the corrupted region meeting or exceeding a threshold size.

11. The method of claim 6, wherein performing the action comprises at least one of:
correcting the first portion of the image data that is corrupt,
associating metadata with the image data indicative of the first portion of the image data that is corrupt, or
refraining from sending the image data to a consumer device.

12. The method of claim 6, wherein the image data further includes:
a fourth data integrity value representing a full frame of the image data, the fourth data integrity value determined by the second processor unit, and
a fifth data integrity value representing the full frame of the image data, the fifth data integrity value determined by a third processor unit.

13. The method of claim 12, further comprising determining, by the first processor unit, that the image data is corrupt based at least in part on the fourth data integrity value not being equal to the fifth data integrity value.

14. The method of claim 6, wherein the first processor unit is a parallelized processor unit that is associated with a vehicle and the image data is received from a camera module of the vehicle, the method further comprising determining that the corrupt first portion of the image data is associated with transmission of the image data via a communication connection between the camera module and the first processor unit.

15. One or more non-transitory computer-readable media storing instructions that, when executed by one or more processors, cause the one or more processors to perform operations comprising:
- receiving, at a first processor unit, image data and multiple data integrity values, the multiple data integrity values including a first data integrity value corresponding to a first portion of the image data and a second data integrity value corresponding to a second portion of the image data;
- determining, by the first processor unit, a third data integrity value corresponding to the first portion of the image data, wherein the first processor unit is associated with a first assurance level in which a probability of computing error is associated with a first level;
- determining, based at least in part on the first data integrity value and the third data integrity value, that the first portion of the image data is corrupt; and
- performing an action based at least in part on determining that the first portion of the image data is corrupt, wherein the action is performed by a second processor unit that is associated with a second assurance level in which the probability of the computing error is associated with a second level that is less than the first level.

16. The one or more non-transitory computer-readable media of claim 15, wherein:
- the first portion of the image data comprises a line of pixel data of the image data, and
- the first data integrity value comprises one of a cyclic redundancy check (CRC) value, a hash value, a checksum value, or a parity bit representing a combination of pixel data values included within the line of pixel data.

17. The one or more non-transitory computer-readable media of claim 15, wherein determining that the first portion of the image data is corrupt is based at least in part on determining that the first data integrity value does not equal the third data integrity value.

18. The one or more non-transitory computer-readable media of claim 15, wherein performing the action comprises at least one of:
- correcting the first portion of the image data that is corrupt,
- associating metadata with the image data indicative of the first portion of the image data that is corrupt, or
- refraining from sending the image data to a consumer device.

19. The one or more non-transitory computer-readable media of claim 15, the operations further comprising determining, by the first processor unit, that the first portion of the image data is corrupt based at least in part on a fourth data integrity value not being equal to a fifth data integrity value, the fourth data integrity value and the fifth data integrity value included in multiple hash values, wherein:
- the fourth data integrity value represents a full frame of the image data, the fourth data integrity value determined by the second processor unit, and
- the fifth data integrity value represents the full frame of the image data, the fifth data integrity value determined by a third processor unit.

20. The one or more non-transitory computer-readable media of claim 15, the operations further comprising:
- determining a fourth data integrity value representing the second portion of the image data; and
- determining, based at least in part on the second data integrity value and the fourth data integrity value, that the second portion of the image data is correct.

* * * * *